(12) United States Patent
Hung et al.

(10) Patent No.: US 8,547,455 B2
(45) Date of Patent: *Oct. 1, 2013

(54) IMAGE PROCESSING CIRCUIT FOR PROCESSING IMAGE ABNORMALITY CAUSED BY POWER SUPPLY

(75) Inventors: Min-Hui Hung, Hsinchu (TW); Chung-Chih Luo, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/415,846

(22) Filed: Mar. 9, 2012

(65) Prior Publication Data

US 2012/0176519 A1 Jul. 12, 2012

Related U.S. Application Data

(63) Continuation of application No. 12/436,794, filed on May 7, 2009, now Pat. No. 8,159,569.

(30) Foreign Application Priority Data

Mar. 5, 2009 (TW) ................................ 98107134 A

(51) Int. Cl.
*H04N 9/64* (2006.01)
*H04N 5/217* (2011.01)
*H04N 5/225* (2006.01)

(52) U.S. Cl.
USPC ............................ 348/245; 348/241; 348/372

(58) Field of Classification Search
USPC .......................................... 348/372, 241–245
See application file for complete search history.

(56) References Cited

U.S. PATENT DOCUMENTS

| 5,694,030 A | 12/1997 | Sato et al. |
| 2004/0246044 A1 | 12/2004 | Myono et al. |

OTHER PUBLICATIONS

"Office Action of Taiwan Counterpart Application", issued on Jan. 25, 2013, p. 1-p. 7, in which the listed references were cited.

*Primary Examiner* — Michael Osinski
*Assistant Examiner* — Quan Pham
(74) *Attorney, Agent, or Firm* — Jianq Chyun IP Office

(57) ABSTRACT

An image processing circuit includes an analogue front-end (AFE) processing unit, comprising a horizontal driver, an image-capturing unit, a voltage current regulation unit, and a dummy loading device. The image-capturing unit is driven by the horizontal driver. The voltage current regulation unit at least provides a voltage and a current to the AFE processing unit. The dummy loading device bears an inrush current noise of the current, connected to an output terminal of the voltage current regulation unit. During a predetermined time section just before a start of transmitting a horizontal shift clock by the AFE processing unit to the image-capturing unit, the dummy loading device is set at a turned-on state within the predetermined time section, and set at a turned-off state other than the predetermined time section.

6 Claims, 7 Drawing Sheets

US 8,547,455 B2

IMAGE PROCESSING CIRCUIT FOR PROCESSING IMAGE ABNORMALITY CAUSED BY POWER SUPPLY

CROSS-REFERENCE TO RELATED APPLICATION

This application is a continuation application of and claims the priority benefit of a prior application Ser. No. 12/436,794, filed on May 7, 2009, now pending. The prior application Ser. No. 12/436,794 claims the priority benefit of Taiwan application serial no. 98107134, filed on Mar. 5, 2009. The entirety of each of the above-mentioned patent applications is hereby incorporated by reference herein and made a part of this specification.

BACKGROUND OF THE INVENTION

1. Field of the Invention

The present invention relates to an image-capturing technique. More particularly, the present invention relates to a technique for processing image abnormality caused by power supply.

2. Description of Related Art

With development of digital still camera (DSC) techniques, and progress of digital signal processing techniques, besides a high resolution, a high-ISO performance of the DSC is also pursued in the market. However, technique problems are also generated. To achieve the high resolution, more sensing pixels are required, so that a larger current is required to transmit data (image). In case that the high-ISO is required and the sensing pixels are not increased, an analogue gain has to be increased. Under such a strict condition, a speed of a transient response of a power system can also influence an image quality.

FIG. 1 is a block diagram illustrating a commonly used DSC system. Referring to FIG. 1, the DSC 90 includes a digital signal processor (DSP) 100, an analogue front end (AFE) unit 96, a charge coupled device (CCD) 98, a low drop-out (LDO) voltage regulator 94, and a power supply 92, wherein the LDO voltage regulator 94 can also be a DC/DC converter. A function of the LDO voltage regulator 94 or the DC/DC converter 94 is used for supplying power to the circuit units. The DSP 100 controls operations of the whole system (including operations of the AFE processing unit 96 and the CCD 98). When the AFE processing unit 96 receives a horizontal sync signal Hsync from the DSP 100, the AFE processing unit 96 outputs a horizontal and a vertical control signals $\Phi_H$ and $\Phi_V$ to the CCD 98, and simultaneously receives an output signal OS from the CCD 98. The image data of the output signal OS is processed by an ADC/AGC 116 and an ADC 110, and is converted from an analogue signal to a digital signal, and then is transmitted to the DSP 100. This is an image processing process of the DSC 90. The DSP 100 can also control a lens driver 124 to interactively control a lens module 126.

Other elements such as memory devices RAM 104 and ROM 106, and a LCD panel 102 are used for displaying images. Further, the AFE processing unit 96 further includes a timing generator (TG) 108, and the TG 108 respectively generates a horizontal clock and a vertical clock to a horizontal driver 112 and a vertical driver 114. The LDO voltage regulator 94 provides a horizontal voltage $V_{\Phi H}$ and a horizontal current $I_{\Phi H}$ to the horizontal driver 112 for driving the image on horizontal scan lines. The image sensed by the CCD 98 is output by line data one after another.

Since at an initial stage, the horizontal current $I_{\Phi H}$ has an inrush noise of transient oscillation, a quality of the front part of the output image is influenced. For example, vertical stripes, horizontal stripes, ghosts, pits, etc., may all severely influence the quality of the image.

FIG. 2 is a timing diagram of a conventional image transmission. FIG. 3 is an amplified diagram of an initial section 140 during the conventional image transmission of FIG. 2. Referring to FIG. 2, FIG. 2 is a timing diagram of the horizontal sync signal Hsync, the horizontal control signal $\Phi_H$, the horizontal voltage $V_{\Phi H}$ and the horizontal current $I_{\Phi H}$, etc. The horizontal control signal $\Phi_H$ is a horizontal shift clock. When the AFE processing unit 96 outputs the horizontal control signal $\Phi_H$ to the CCD 98, a transient high current about 100 mA can be generated. The horizontal driver 112 used for outputting the horizontal control signal $\Phi_H$ may have an unstable current and voltage due to such transient high current, so that the analogue signal of the image of the CCD 98 at the initial section of a left part can be interfered to having noises such as vertical stripes, etc. Such unstable current and voltage phenomenon is shown as the initial section 140, and an amplified diagram thereof is shown as FIG. 3.

Referring to FIG. 3, by amplifying the initial section 140 that the horizontal control signal $\Phi_H$ is initially transmitted, it is obvious that when the current is unstable, the initial section 140 exceeds a dummy pixel region 142 of a line data of a horizontal image, and some of pixel regions 146 belonged to the effective pixel region 144 has been transmitted. Namely, since the current is unstable at the initial section, bad pixels at the pixel region 146 can influence the image quality of a left part (an initial position) of the CCD image that corresponds to the region 146, which is a main reason that causes the noise.

Therefore, at least the aforementioned problem of image noise has to be resolved.

SUMMARY OF THE INVENTION

The present invention is directed to a method and a circuit for processing image abnormality caused by power supply, so as to at least resolve a problem of front-end noise of an image.

The present invention provides an image processing circuit includes an analogue front-end (AFE) processing unit, comprising a horizontal driver, an image-capturing unit, a voltage current regulation unit, and a dummy loading device. The image-capturing unit is driven by the horizontal driver. The voltage current regulation unit at least provides a voltage and a current to the AFE processing unit. The dummy loading device bears an inrush current noise of the current, connected to an output terminal of the voltage current regulation unit. During a predetermined time section just before a start of transmitting a horizontal shift clock by the AFE processing unit to the image-capturing unit, the dummy loading device is set at a turned-on state within the predetermined time section, and set at a turned-off state other than the predetermined time section.

In order to make the aforementioned and other features and advantages of the present invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

The present invention provides a circuit and a method for at least processing image abnormality caused by power supply. A plurality of embodiments is provided below to describe the present invention, though the present invention is not limited to the provided embodiments.

In the present invention, a horizontal shift clock $\Phi_H$ is processed. For example, by setting a dummy loading device, using a LDO voltage regulator or a DC/DC converter with a fast transient response, or using an inductor and a capacitor, a transient response curve of the LDO voltage regulator or the DC/DC converter can be modified.

Figure 1:
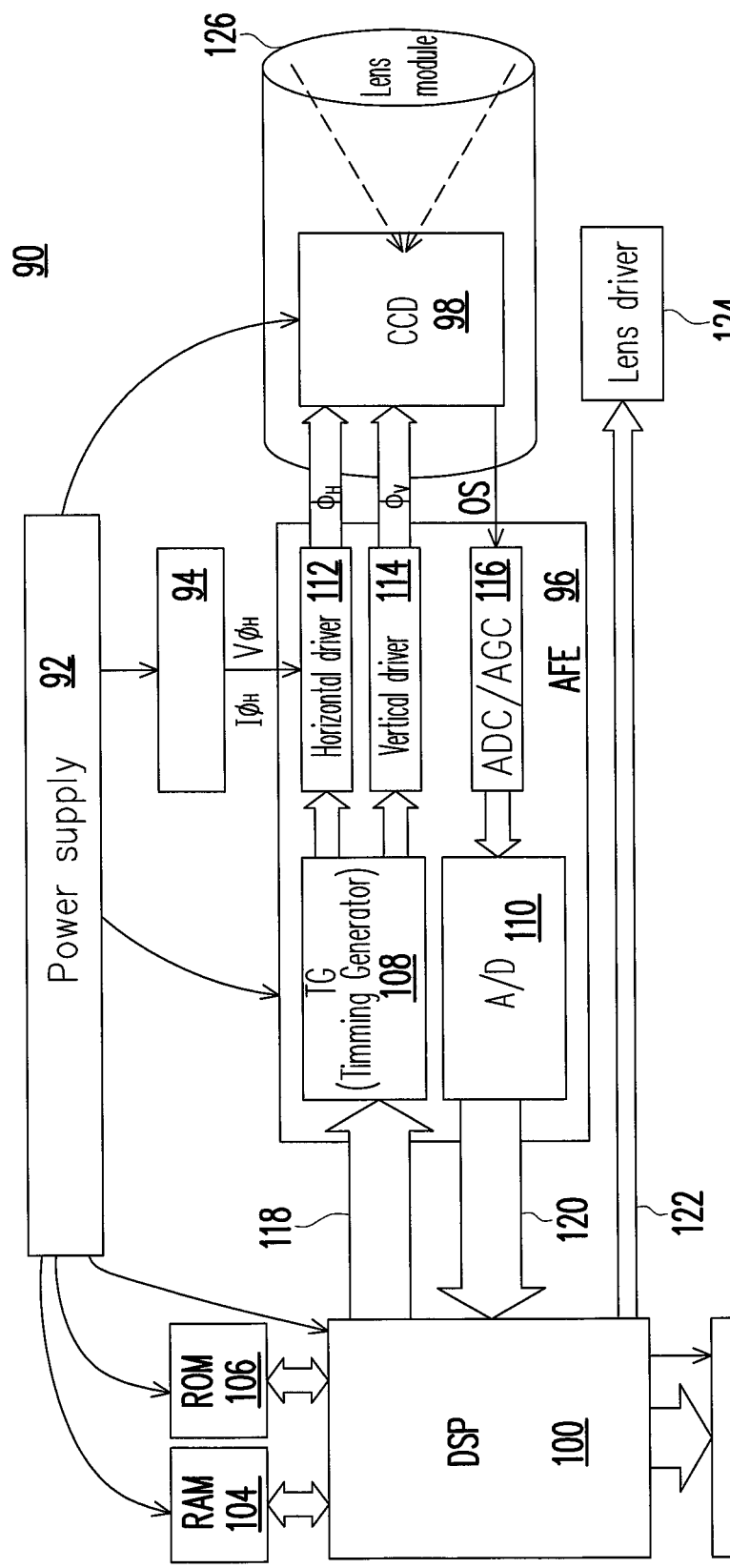
FIG. 1 is a block diagram illustrating a DSC system.
Figure 2:
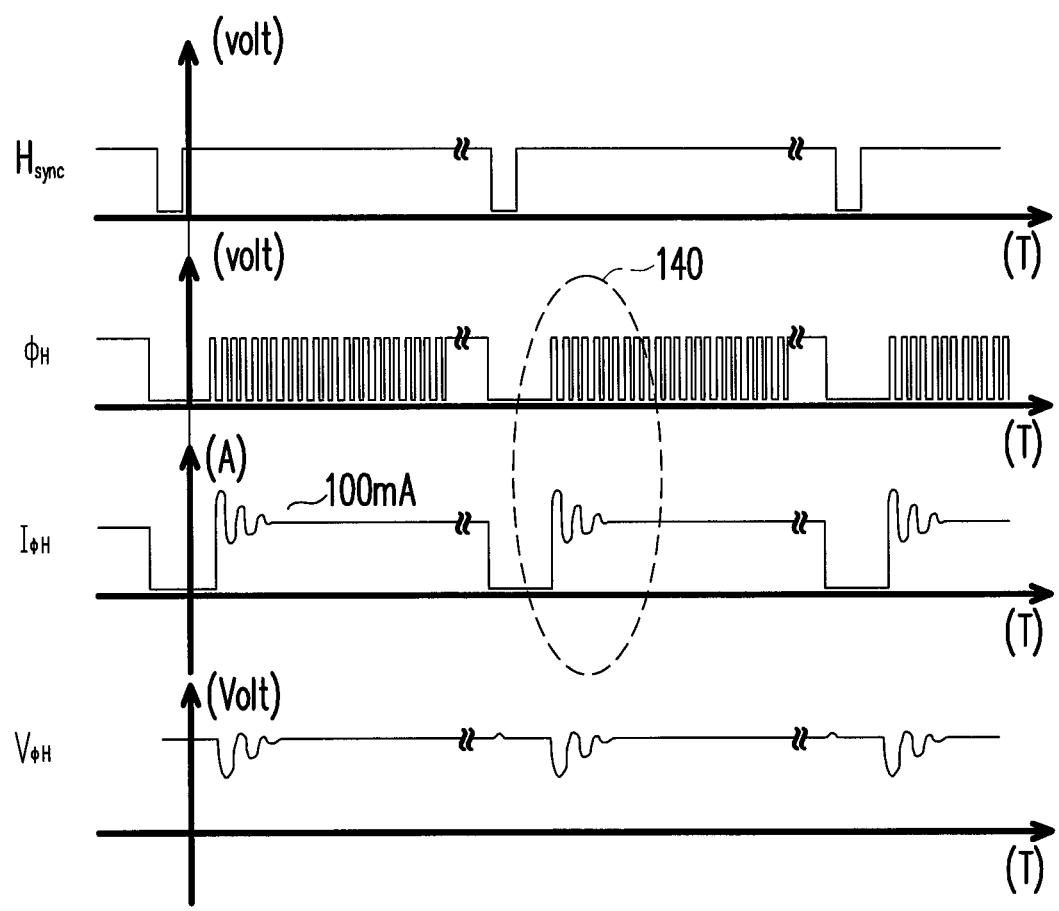
FIG. 2 is a timing diagram of a conventional image transmission.
Figure 3:
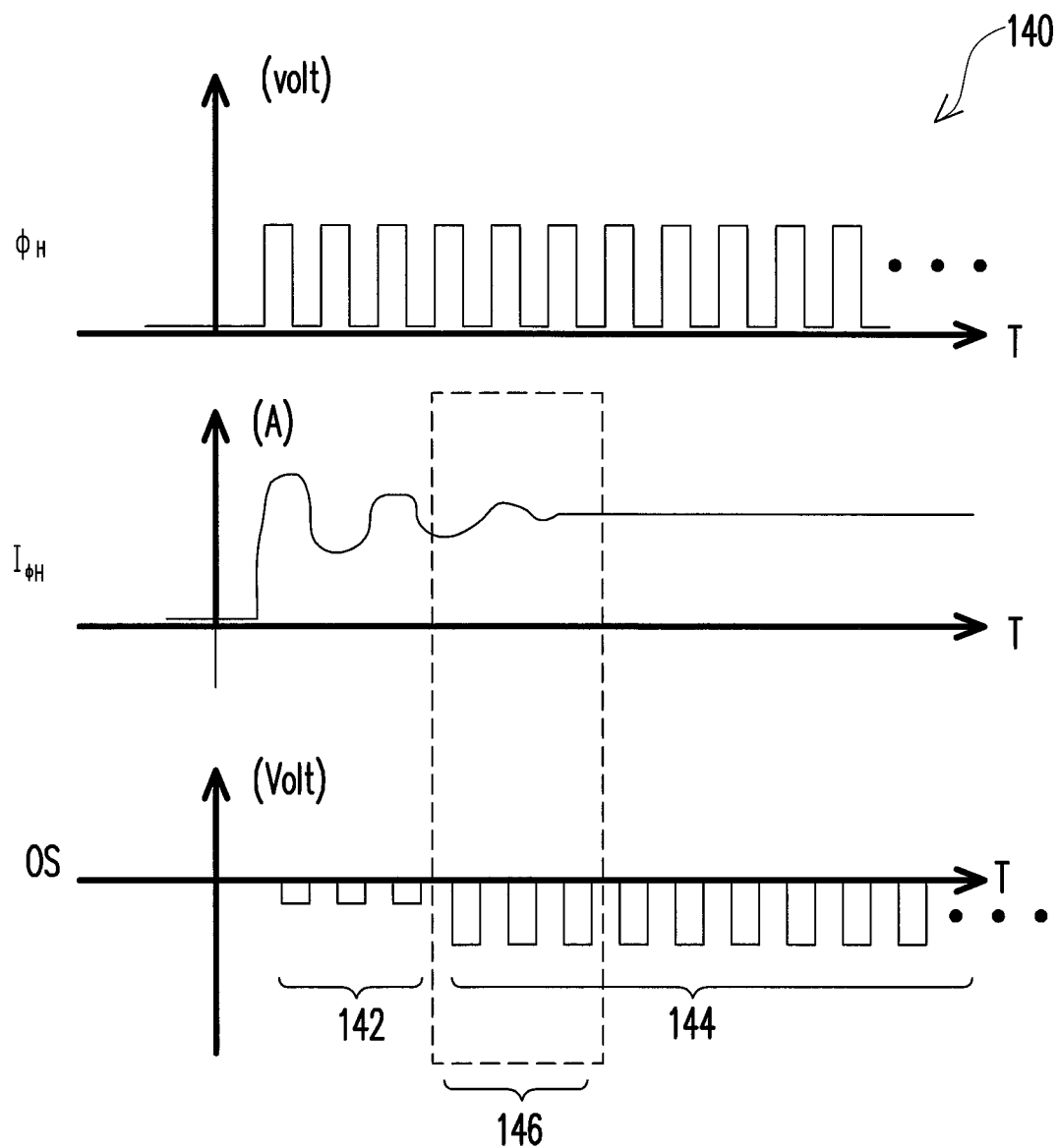
FIG. 3 is an amplified diagram of an initial section 140 during a conventional image transmission of FIG. 2.
Figure 4:
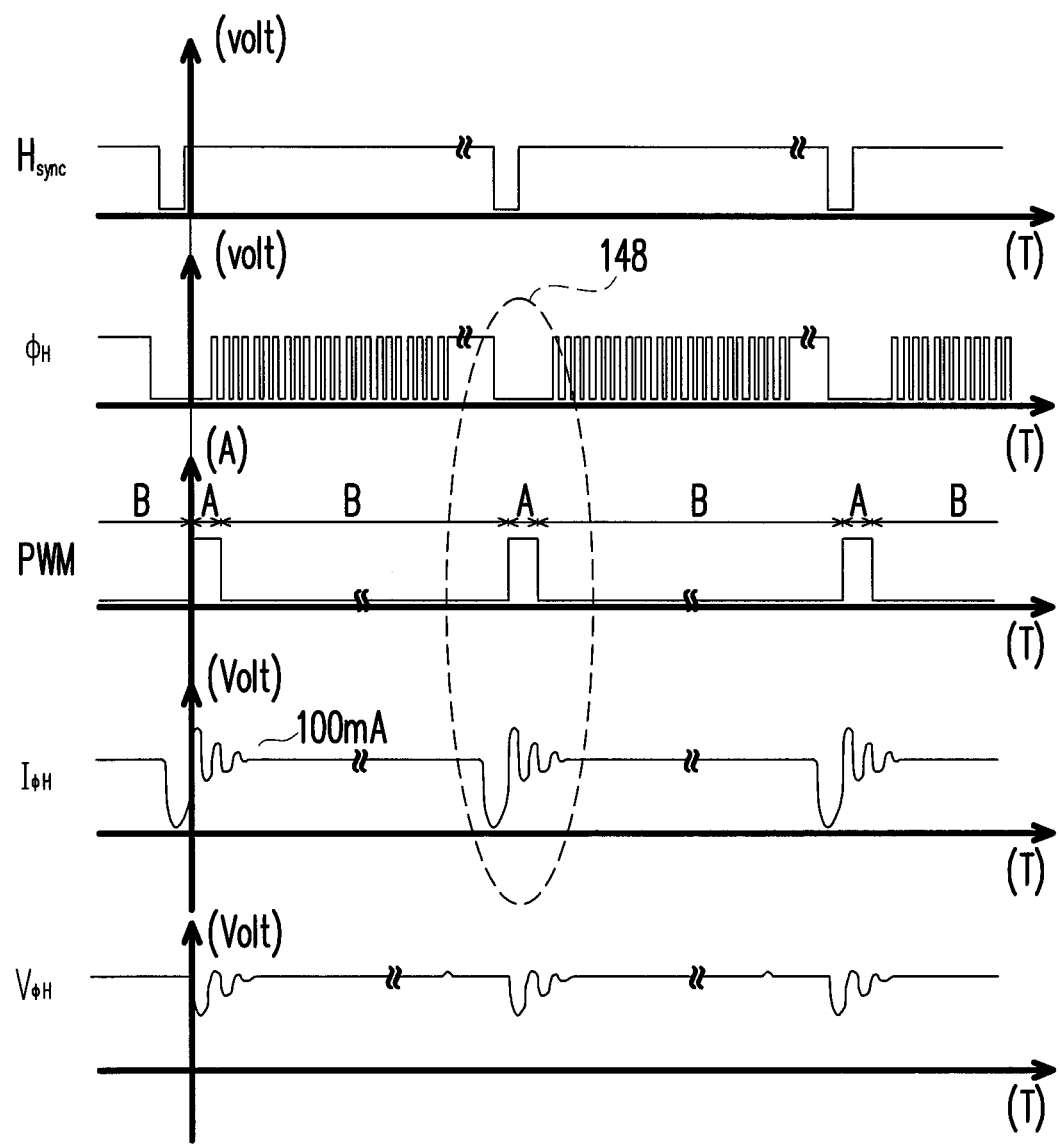
FIG. 4 is a schematic diagram illustrating a mechanism of processing a horizontal shift clock $\Phi_H$ according to an embodiment of the present invention.
Figure 5:
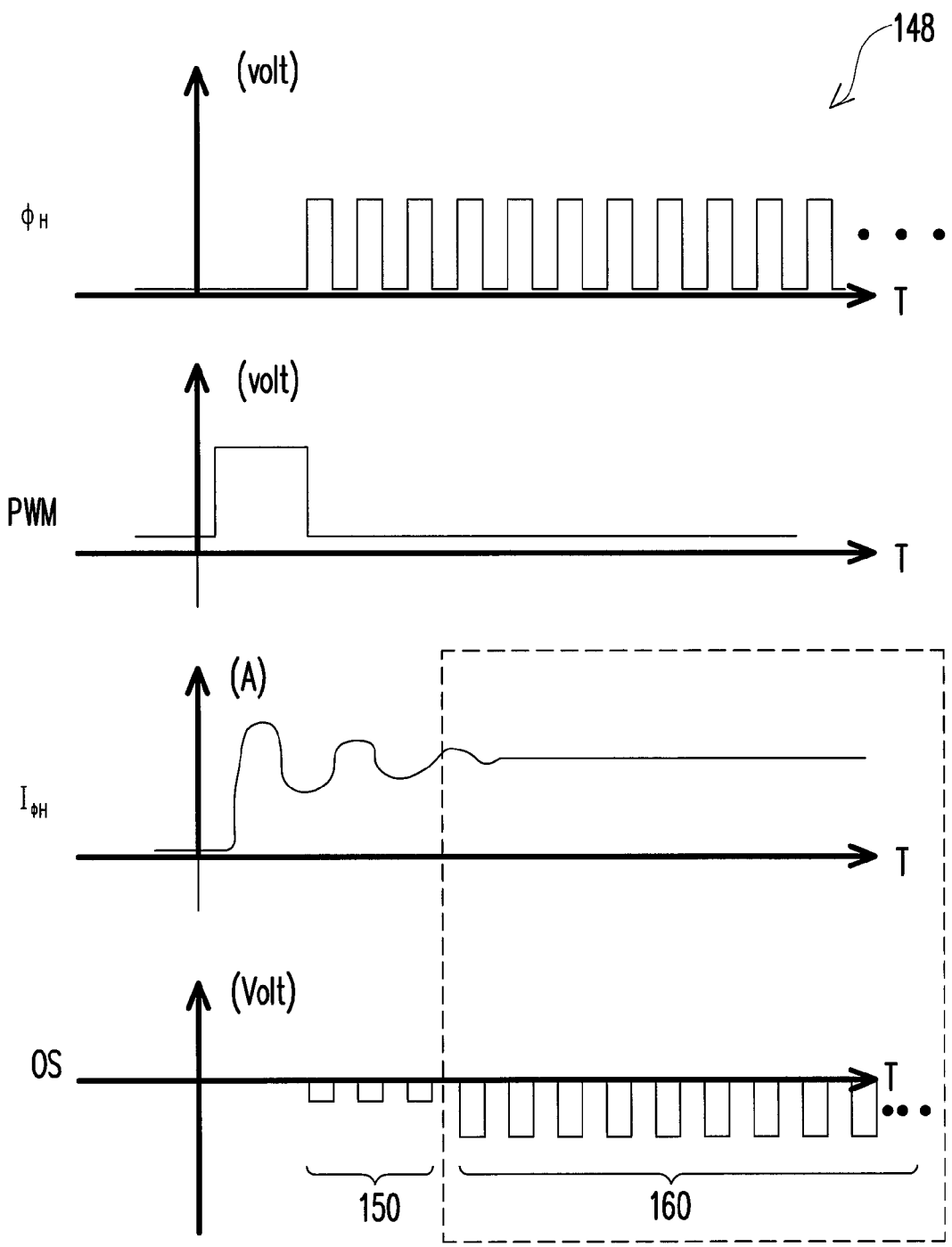
FIG. 5 is an amplified diagram of a region of FIG. 4.
Figure 6:
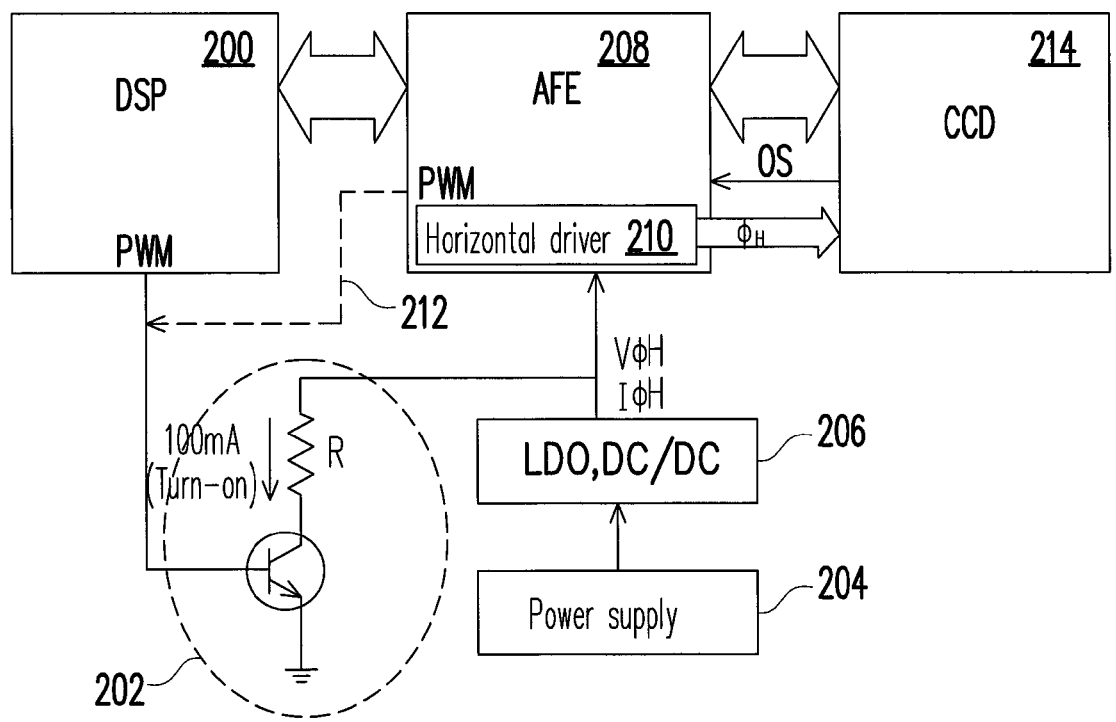
FIG. 6 is a block diagram of a circuit for processing image abnormality caused by power supply according to an embodiment of the present invention and a mechanism of FIG. 4.

FIG. 4 is a schematic diagram illustrating a mechanism of processing the horizontal shift clock $\Phi_H$ according to an embodiment of the present invention. FIG. 5 is an amplified diagram of a region of FIG. 4. FIG. 6 is a block diagram of a circuit for processing image abnormality caused by power supply according to an embodiment of the present invention and a mechanism of FIG. 4. Referring to FIGS. 4-6, in the present embodiment, a dummy loading device 202 is applied. For example, in a driving circuit of a DSC system applying a CCD 214, a DSP 200 functions as the DSP 100 of FIG. 1, which is used for controlling a digital image-capturing apparatus. In allusion to the horizontal shift clock $\Phi_H$, the dummy loading device 202 is added to a horizontal driver 210 of an AFE processing unit 208 to serve as a load device. The dummy loading device 202 can be implemented by a simple circuit, for example, can be implemented by a switch and a resistor, wherein the switch can be, for example, implemented by a semiconductor transistor such as a bipolar junction transistor (BJT) or a metal oxide semiconductor (MOS) transistor. The transistor can be turned on or turned off in response to a control signal to serve as a switch, which is easy to be controlled. In the present embodiment, the BJT is taken as an example, and the BJT is turned on/off in response to a PWM signal 212. The PWM signal 212 is, for example, generated by the DSP 200. Though, the AFE processing unit 208 can also generate the PWM signal 212. In other words, the DSP 200 or the AFE processing unit 208 can all generate the PWM signal 212, or an equivalent PWM signal can be generated by other units. One end of the dummy loading device is couple to an input terminal of the AFE processing unit 208, and another end thereof is coupled to the ground. The input terminal of the AFE processing unit 208 receives a horizontal voltage $V_{\Phi H}$ and a horizontal current $I_{\Phi H}$ from the LDO voltage regulator 206. A power supply 204 provides a system voltage to the LDO voltage regulator 206. The input terminal of the AFE 208 can also be coupled to the DC/DC converter.

According to FIG. 4, when the horizontal sync signal Hsync is activated, the horizontal shift clock $\Phi_H$ is not immediately generated. Since the dummy loading device 202 is applied, the dummy loading device 202 can be turned on by the PWM signal during a time section A, so that the horizontal voltage $V_{\Phi H}$ and the horizontal current $I_{\Phi H}$ can reach a stable state before the horizontal shift clock $\Phi_H$ is transmitted. By such means, a transient high current vibration of the LDO voltage regulator 206 can be reduced. During a time section B, the dummy loading device 202 is turned off, so that a line data of an image is started to be transmitted according to the horizontal shift clock $\Phi_H$. An amplified diagram of the time section A is shown in FIG. 5.

According to FIG. 5, before the effective pixel region 160 is transmitted by the output signal OS of the CCD 214, an inrush current noise can be generated ahead due to a current generated by a load resistor, so that the noise of the left part (the initial position) of the CCD image can be effectively reduced. Therefore, since a dummy pixel region 150 is still located in front of the effective pixel region 160, a width of the PWM signal can be suitably matched.

In present embodiment, the dummy loading device 202 is applied to effectively eliminate the noise of the left part of the CCD image. The dummy loading load device used in allusion to the horizontal shift clock $\Phi_H$ can meliorate a general power supply system, and such dummy loading device has no difference in an effect of reducing the noise as device characteristics are varied, and for different combinations of sensors and power supply systems, modifications can be effectively achieved by only performing easy calculations and slightly adjusting the dummy loading load.

Figure 7:
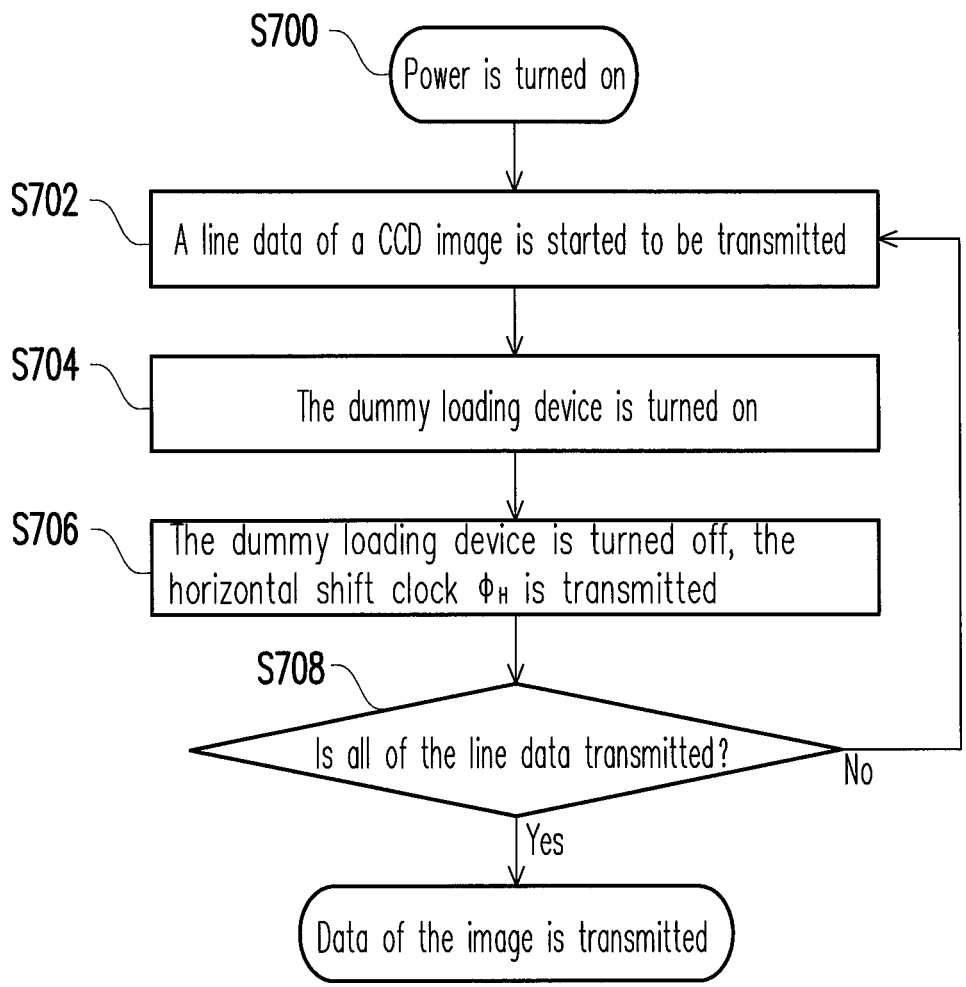
FIG. 7 is a flowchart illustrating a method for processing image abnormality caused by power supply according to an embodiment of the present invention.

FIG. 7 is a flowchart illustrating a method for processing image abnormality caused by power supply according to an embodiment of the present invention. Referring to FIG. 7 and FIG. 6, in step S700, power is turned on to activate the system. In step S702, a line data of a CCD image is started to be transmitted. In step S704, a virtual load mechanism is activated. Namely, the dummy loading device 202 is turned on. In step S706, the dummy loading device 202 is maintained in a turned-on state until the horizontal driver 210 starts to transmit the horizontal shift clock $\Phi_H$, and then the dummy loading device 202 is turned off until a line data of the CCD image is transmitted. In step S708, a next line data is continually transmitted and the above steps are repeated until the image is completely transmitted.

In other words, in the present invention, a horizontal driving current to be input to a horizontal driver is processed, so that the horizontal driving current substantially approaches a stable state before the effective pixel region is output. Regarding a general method, a mechanism thereof is similar to that of the method shown in FIG. 7, by which the horizontal driving current is also processed, so that it substantially approaches a stable state before the effective pixel region is output. Since the current is related to the voltage, processing the horizontal current is equivalent to processing the horizontal voltage, and if the current is stable, it also represents that the voltage is stable. Similarly, if the voltage is stable, it also represents the current is stable.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An image processing circuit, comprising:
an analogue front-end (AFE) processing unit, comprising a horizontal driver;

an image-capturing unit, driven by the horizontal driver;
a voltage current regulation unit, at least providing a voltage and a current to the AFE processing unit; and
a dummy loading device that bears an inrush current noise of the current, connected to an output terminal of the voltage current regulation unit,
wherein during a predetermined time section just before a start of transmitting a horizontal shift clock by the AFE processing unit to the image-capturing unit, the dummy loading device is set at a turned-on state within the predetermined time section, and set at a turned-off state other than the predetermined time section.

2. The image processing circuit in claim 1, wherein the dummy loading device comprising:
a load;
a semiconductor switch device, connected to the load to form a series circuit, the series circuit having a first terminal being connected to an input terminal of the horizontal driver, and a second terminal being connected to ground, and the semiconductor switch device being controlled by a pulse-width modulation (PWM) signal outputted from the AFE processing unit.

3. The image processing circuit in claim 2, wherein the load is a resistor.

4. The image processing circuit in claim 1, wherein the voltage current regulation unit comprises a low drop-out (LDO) voltage regulator or a DC/DC converter.

5. The image processing circuit in claim 1, wherein the horizontal driver of the AFE processing unit provides a horizontal clock to the image-capturing unit, so that the image-capturing unit transmits an image data being captured.

6. The image processing circuit in claim 5, wherein when the dummy loading device is set at the turned-on state, the current output from the voltage current regulation unit first flows into the dummy loading device, so that the dummy loading device bears the inrush current noise of the current.

* * * * *